Jan. 2, 1968     H. R. CAGLE     3,361,240
SLIP COUPLING FOR MOTORIZED VALVE
Filed May 2, 1966
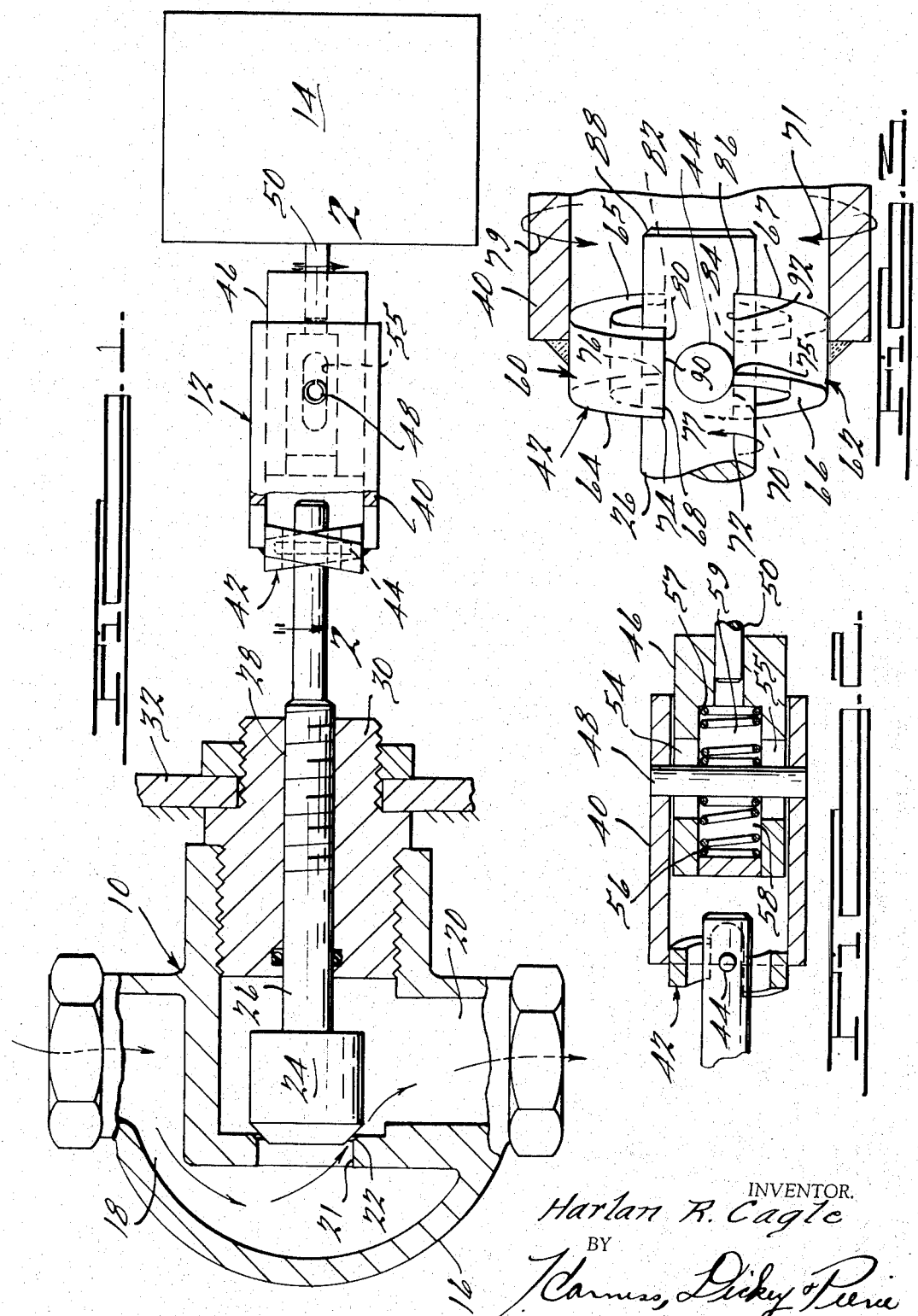
INVENTOR.
Harlan R. Cagle
BY
Karnes, Dickey & Pierce
ATTORNEYS.

United States Patent Office 3,361,240
Patented Jan. 2, 1968

3,361,240
SLIP COUPLING FOR MOTORIZED VALVE
Harlan R. Cagle, Clarkston, Mich., assignor to Sahlin Engineering Co., Inc., Troy, Mich., a corporation of Michigan
Filed May 2, 1966, Ser. No. 547,025
7 Claims. (Cl. 192—141)

ABSTRACT OF THE DISCLOSURE

There is herein disclosed a coupling means for connecting a reversible electric motor to a rotatable valve. The coupling means comprises telescopically mounted sleeve elements by which the electric motor may be positively automatically disengaged from the valve stem after a predetermined axial displacement has been obtained.

---

This invention relates to a valve control arrangement for use with a speed control valve in an air supply system for operating apparatus of a press unloader or the like of the type disclosed in U.S. 2,609,776.

The primary object of the invention is to provide a new and improved coupling between a valve and a reversible electric motor type valve operator.

The invention is hereinafter described in detail by reference to the accompanying drawings in which:

FIGURE 1 is a side elevational view, partly in section, of apparatus embodying the inventive concepts;

FIG. 2 is an enlarged partial side elevational view, in section, of a portion of the apparatus shown in FIG. 1; and FIG. 3 is an enlarged partial side elevational view, partly in section, of a portion of the apparatus shown in FIG. 2.

Referring now to the drawings, a valve unit 10 of conventional design is connected by coupling means 12 to actuating means in the form of a reversibly operable electric motor 14 of conventional design.

Valve unit 10 comprises a housing 16 having flow passages 18, 20 connected through a port 21 having a valve seat 22. A valve 24 is axially movable, between closed and variably spaced open positions relative to the valve seat to control the rate of flow of air through port 21, for example. Movement of the valve is obtained by rotation of a valve stem 26 which is threadably mounted as at 28 in a cap 30. When the valve stem is rotated, the cooperative reaction of the threaded portions causes axial displacement of the valve and valve stem relative to the valve housing and cap which are fixedly mounted by any suitable means 32.

Valve units of this type are susceptible to being axially displaced against the valve seat so far as to damage the valve and valve seat. Also, valves of this type are sometimes closed so tightly as to make opening very difficult.

In order to more accurately control the axial displacement of the valve when operated by the electric motor 14 and eliminate the aforerecited problems, the coupling means 12 comprises means to effectively positively automatically disengage the vave stem 26 and the actuating means 14 after a predetermined axial displacement has been obtained.

The coupling means 12 comprises an outer sleeve element 40 having cam means 42 mounted at one end for driving engagement, at certain times, with a pin 44 mounted on the valve stem to effect the predetermined axial displacement. At other times, at the end of the predetermined axial displacement, cam means 42 and pin 44 are non-drivingly associated. Another inner sleeve element 46 is telescopically mounted in one end of the outer sleeve element 40 and is drivingly connected thereto by a pin 48. The inner sleeve element 46 is suitably connected to the reversible electric motor by a drive shaft 50 and suitable connecting means. In the illustrative embodiment, sleeve element 46 is telescopically received within the sleeve element 40 and has a relatively close sliding fit therewithin for axial displacement relative thereto. Pin 48 is fixedly mounted in sleeve 40 and extends through oppositely aligned longitudinally extending slots 54, 55 in the inner sleeve 46 which are of a size providing radial driving engagement between the pin 48 and inner sleeve 46 while permitting longitudinal axial displacement therebetween. Compression spring means 56, 57 are mounted on opposite sides of pin 48 in biasing engagement therewith in spring chambers 58, 59 suitably formed in the inner sleeve 46. The springs are of approximately equal strength so as to substantially axially center the pin 48 relative to the ends of slots 54, 55 when the coupling is not subjected to axial loads or to uniform opposite axial loading. Whenever unequal axial loading occurs, the outer sleeve 40 is axially displaceable relative to the inner sleeve 46 in the direction of the axial load against the bias of one of the compression springs.

Cam means 42 is in the form of a pair of semi-ring-like members 60, 62 fixedly mounted in sleeve 40, as by welding, and having axially spaced parallelly inclined cam surfaces 64, 65 and 66, 67 provided at opposite ends thereof. Parallel surfaces 64, 65 are inclined in one direction relative to the longitudinal axes of stem 26 and sleeves 40, 46 and parallel surfaces 66, 67 are equally inclined in an opposite direction. Oppositely located axially extending slot means 68, 70 separate the members 60, 62 and slidably receive the pin 44 which has a radial length less than the inside diameter of sleeve 40 and greater than the inside diameter of rings 60, 62 so as to be axially displaceable within sleeve 40 along the slots 68, 70 between axially spaced non-driving positions of engagement with cam surfaces 64, 66 and cam surfaces 65, 67.

The arrangement is such that when the motor rotates shaft 50, sleeve 46, sleeve 40, semi-ring elements 60, 62, and stem 26 in the direction of the arrow 71, the valve stem and valve are moved toward the closed position. Assuming that a valve closing operation is initiated with the valve open and the coupling in the central position shown in FIGS. 1 and 2, rotation of the drive shaft 50 causes rotation of the inner sleeve 46. Pin 48 is rotated by abutting engagement with sleeve 46 in the slots 54, 55 and rotatably drives outer sleeve 40 and semi-ring elements 60, 62. Pin 44 is rotated by abutting engagement with diagonally opposite side surfaces of semi-ring elements 60, 62 defining slots 68, 70 and rotatably drives and axially displaces valve stem 26. Pin 44 is axially displaced within the slots 68, 70 toward the cam surfaces 64, 66. The cam surfaces 64, 66 terminate at each slot 68, 70 at axially spaced edges 74, 75 along slot 68 and edges 76, 77 along slot 70. When the pin 44 reaches the diagonally opposite edges 75, 76, as indicated in FIG. 3, the driving engagement between the outer sleeve element 40 and the pin 44 is terminated upon continued axial displacement and non-driving engagement is effectuated whereat surfaces 64, 66 slide around the pin 44, which remains stationary, with the outer sleeve rotating relative thereto with sliding engagement between the pin 44 and the cam surfaces 64, 66. When the pin 44 is axially positioned beyond the axially aligned edges 75, 76, the semi-ring elements 60, 62, sleeve 40, and pin 48 are variably axially displaced relative to sleeve 46 by axial displacement of pin 48 in slots 54, 55 against the bias of compression spring 57. Thus, the rotating outer sleeve 40 is cammed away from the pin 44 against the bias of compression spring 57. As the slots 68, 70 are rotated into alignment wih pin 44 over diagonally opposite axially aligned edges 74, 77, the sleeve 40 is forced toward the pin 44 by the compression spring 57 and the pin 44 is again located on the cam surfaces 64, 66 adjacent the axially aligned edges 75, 76. As the sleeve 40 continues to rotate in the direction of the arrow 71, it will be repetitively axially reciprocated back and forth against the bias of the compression spring 57 as the cam surfaces 64, 66 continue to move past the pin 44.

When the direction of rotation is reversed, as indicated by the arrow 79, the pin 44 will become aligned with the slots 68, 70 and abutting engagement will be effected between the pin 44 and the surfaces of the slots adjacent axially aligned edges 74, 77 to again drivingly couple the outer sleeve 40 to the pin 44. Reverse rotation of the valve stem is effected and the pin 44 moves axially along the slots 68, 70 toward cam surfaces 65, 67. When the pin 44 reaches the end of the slots, the driving engagement between the outer sleeve element 40 and the pin 44 is again terminated. Pin 44 remains stationary with the outer sleeve 40 and semi-ring elements 60, 62 rotating relative thereto with sliding engagement between pin 44 and cam surfaces 65, 67. The cam surfaces terminate in axially spaced edges 80, 82 and 84, 86 with diagonally opposite edges 80, 84 and 82, 86 being axially aligned. When pin 44 reaches the edges 80, 84 further rotation of the semi-ring elements and outer sleeve results in relative movement between the cam surfaces 65, 67 and the pin 44 from a position whereat the pin is adjacent the edges 80, 84 to a position adjacent edges 82, 86. The rotating outer sleeve 40 is cammed away from the pin 44 against the bias of compression spring 56. When the edges 82, 86 on the cam surfaces are moved by pin 44, the sleeve 40 is forced toward the pin 44 by compression spring 56 and the pin is again located in alignment with the slots 68, 70 adjacent edges 80, 84. As the sleeve and semi-ring elements continue to rotate in the direction of the arrow 79, they will be axially reciprocated back and forth against the bias of the compression spring 56 as the cam surfaces 65, 67 are moved past the pin 44 without further rotative movement being imparted to the valve stem 26. When the direction of rotation is again reversed, the pin 44 becomes aligned with the slots 68, 70 and is brought into abutting engagement with the slot surfaces adjacent the edges 82, 86 to again drivingly couple the outer sleeve 40 to the pin 44.

In this manner, the valve stem may be selectively moved axially between axially spaced positions of predetermined spacing without any possibility of causing movement beyond those positions.

The axial displacement obtained may be varied as necessary or desired by varying the length of axial travel of the pin in the slots 68, 70. Also the width of the slots can be varied so as to obtain maximum free play upon reversal of direction of rotation. One of the advantages of the present invention is that a substantial amount of rotation without load may be obtained before driving engagement is effected after maximum axial displacement has been obtained and the pin 44 is located on the cam surfaces. Thus, with gear motors, for example, the motor may be energized upon reversal for a short period of time before driving engagement occurs.

It will be obvious to those skilled in the art to which this invention relates that the inventive principles herein-disclosed are susceptible of various modifications and changes in design. For example, the relative positions of the inner and outer sleeves may be reversed and the relative positions of the connecting pins may also be reversed.

In the broader aspects of the present invention, it may be observed, in the illustrative embodiment, that a coupling is provided for a drive means 14 and a driven means 26 with an end portion 40 of the drive means and an end portion 88 of the driven means mounted in overlapping telescopic relationship. Pin means 44 are mounted on one end portion and received between at least one pair of opposite parallel drive surfaces 90, 92 on the other end portion. It will be apparent to those skilled in the art to which this invention relates that certain of the beneficial results provided by the invention are obtainable by use of only one of the slots 68, 70 and, also, by use of only one pair of cam surfaces at one end of the slots, which cam surfaces would be combined into a single surface if only one slot is utilized. Lost motion means are provided at at least one end of the drive surfaces by cam surface means 64, 66. The terminal portion 74 of one of the drive surfaces 90 extends axially beyond the terminal portion 75 of the other of the drive surfaces 92. Thus, the driven means is rotatively connected to the drive means and axially displaceable thereby when the pin means 44 is abuttingly engaged with one of the drive surfaces, and is rotatively disconnected from the drive means and axially stationary when the pin means is abuttingly engaged with the cam surface means. When the drive means and driven means are rotatively disconnected, additional lost motion means provided by pin 48 and slots 54, 55 permit relative axial displacement between the drive means and the driven means.

Accordingly, it is intended that the following claims be construed to cover the inventive principles however employed except insofar as limited by the prior art.

The invention claimed is:

1. A coupling operable to rotatively connect a reversibly rotatable drive means to a reversibly rotatably drivable driven means rotatable about and axially displaceable along a longitudinal axis when rotatively connected to said drive means, and to control the length of axial displacement of the driven means along the longitudinal axis by rotatively disconnecting said drive means and said driven means after said driven means is axially displaced a predetermined distance, comprising:

an end portion of said drive means and an end portion of said driven means being mounted in overlapping telescopic relationship, one end portion having an opening extending parallel to the longitudinal axis and the other end portion having a projection extending parallel to the longitudinal axis and mounted within said opening, pin means mounted on one end portion, at least one pair of opposite parallel drive surfaces extending parallel to the longitudinal axis and defining axially extending slot means therebetween in the other end portion, said pin means extending radially toward the other end portion transversely to the longitudinal axis and being received between said drive surfaces within said slot means in a position of driving engagement when said drive means is rotatively connected to said driven means, said pin means being located axially beyond at least one of said drive surfaces without said slot means in a position of non-driving engagement when said drive means is rotatively disconnected from said driven means, one of the drive surfaces being engaged with said pin means during rotation in one direction and causing corresponding rotative movement of said drive means and said driven means and causing relative axial displacement of said driven means in a first direction, the other of said drive surfaces being engaged with said pin means during rotation in the opposite direction and causing corresponding rotative movement of said drive means and said driven means and causing relative axial displacement of said driven means in a second opposite direction, lost motion means provided at at least one end of said slot means by cam surface means intersecting said drive surfaces and extending transversely to and being inclined to the longitudinal axis, said cam surface means extending radially in overlapping relationship with said pin means and circumferentially between said drive surfaces and intersecting said drive surfaces at axially spaced locations with the terminal portion of the other of said drive surfaces extending beyond the terminal portion of the one of said drive surfaces, said driven means and said drive means being rotatively connected for corresponding rotative movement and relative axial displacement along said longitudinal axis by axial displacement of said pin means within said slot means toward said cam surface means during rotation in one direction with said pin means engaged with the one of said drive surfaces within said slot means, said driven means being rotatively disconnected from said drive means after relative axial displacement between said driven means and said drive means toward said cam surface means sufficient to move said pin means from the position of driving engagement with said one of said drive surfaces to the position of non-driving engagement axially beyond the terminal portion of said one of said drive surfaces and into engagement with said cam surface means, said drive means being further rotatable in said one direction relative to said driven means when said pin means is located beyond the terminal portion of said one of said drive surfaces by relative rotative movement between said pin means and said cam surface means, and, upon reversal of rotation, said pin means being drivingly engaged with the terminal portion of the other of said drive surfaces extending beyond the terminal portion of the one of said drive surfaces and causing corresponding rotative movement between said drive means and said driven means in the opposite direction and causing relative axial displacement along said longitudinal axis by axial displacement of said pin means within said slot means in the opposite direction.

2. The invention as defined in claim 1 and having: additional lost motion means permitting relative axial displacement between said drive means and said driven means during relative rotative movement between said pin means and said cam surface means.

3. The invention as defined in claim 1 and said additional lost motion means comprising; spring means maintaining said cam means in camming engagement with said pin means.

4. The invention as defined in claim 1 wherein:

said other end portion being a rotatively axially displaceable valve stem, said pin means being mounted on said valve stem and extending radially outwardly therefrom, said one end portion comprising a first sleeve element, said slot means being formed within said sleeve element and said drive surfaces extending radially inwardly toward said pin means, a second sleeve element telescopically mounted relative to said first sleeve element, a radially extending drive pin extending through said first sleeve element and said second sleeve element and rotatively drivingly connecting said first sleeve element and said second sleeve element, axially extending slots formed in said second sleeve element, said drive pin being received in said slots to permit axial sliding relative movement between said first sleeve element and said second sleeve element, a first spring element mounted within said second sleeve element on one side of and abutting said drive pin and biasing said drive pin in one axial direction, a second spring element mounted within said second sleeve element on the opposite side of and abutting said drive pin and biasing said drive pin in the opposite axial direction, said first spring element and said second spring element maintaining said drive pin centrally axially positioned within said slots during corresponding rotative movement of said drive means and said driven means and permitting axial reciprocation of said drive pin in said slots during relative rotative movement between said drive means and said driven means, said one end portion further comprising reversibly rotatable drive shaft means of an electric motor or the like, and said second sleeve element being drivably connected to said drive shaft means whereby said valve stem is axially displaceable between predetermined limits determined by the length of said drive surfaces.

5. The invention as defined in claim 1 and having lost motion means provided at each end of said slot means by cam surface means intersecting said drive surfaces and extending transversely to and being inclined to the longitudinal axis.

6. The invention as defined in claim 5 and having additional lost motion means permitting reciprocable movement between said drive means and said driven means during relative rotative movement between said pin means and said cam surface means at opposite ends of said slot means, and spring means associated with said lost motion means and maintaining said cam means and said pin means in camming engagement at both ends of said slot means.

7. The invention as defined in claim 6 and said additional lost motion means comprising radially extending pin means and axially extending slot means, said pin means being mounted in said slot means for axial displacement therewithin, and said spring means comprising a first spring element biasing said pin means in one direction toward a central position within said slot means and a second spring element biasing said pin means in the opposite direction toward the central position within said slot means.

No references cited.

MARK M. NEWMAN, *Primary Examiner.*

C. M. LEEDOM, *Assistant Examiner.*